United States Patent [19]
Dybwad

[11] Patent Number: 5,173,744
[45] Date of Patent: Dec. 22, 1992

[54] REFRACTIVELY SCANNED INTERFEROMETER

[76] Inventor: Jens R. Dybwad, 19 Kessler Farm Dr., Suite 403, Nashua, N.H. 03063

[21] Appl. No.: 672,794

[22] Filed: Mar. 21, 1991

[51] Int. Cl.$^5$ .................................................. G01B 9/02
[52] U.S. Cl. ...................................................... 356/346
[58] Field of Search ................................. 356/346, 345

[56] References Cited

U.S. PATENT DOCUMENTS 4,265,540 5/1981 Doyle .................................. 356/346
4,585,345 4/1986 Inoue .................................. 356/346

*Primary Examiner*—Samuel A. Turner
*Assistant Examiner*—La Charles P. Keesee
*Attorney, Agent, or Firm*—Sherman H. Goldman

[57] ABSTRACT

A modified Michelson type of interferometer having a pair of substantially identical refractive prisms, each having a cross sectional shape of ½ of a hexagon, the division being along a line bisecting opposite sides of the hexagon, where each of the prisms has a side for beam input or output, a side that is coated to provide a mirror for beam reflection and a beamsplitter coating applied to one of the two surfaces along the line of division. Additionally, a collimating and/or focusing lens may be integral with the prism having the input or output side, such that linear, constant speed, relative scanning of the prisms in the direction of the line of division of the prisms enables the elimination of the mounting of all components, made a part of or attached to the prisms, to an optical bench.

19 Claims, 2 Drawing Sheets

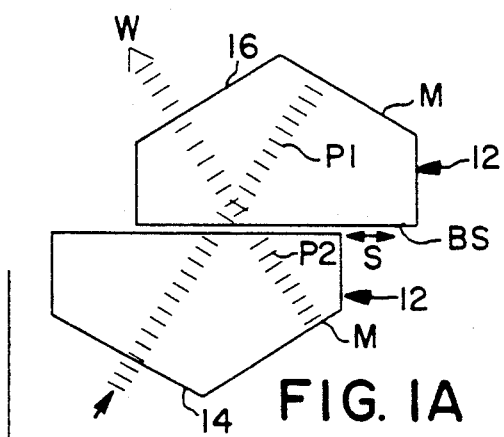
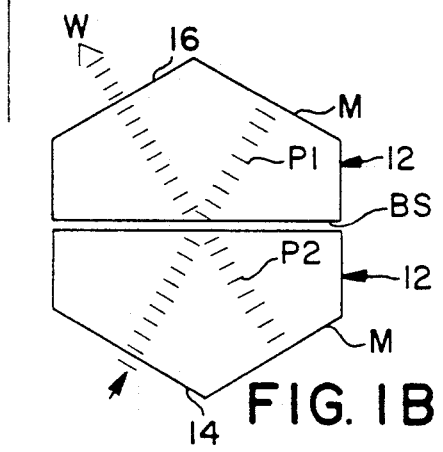
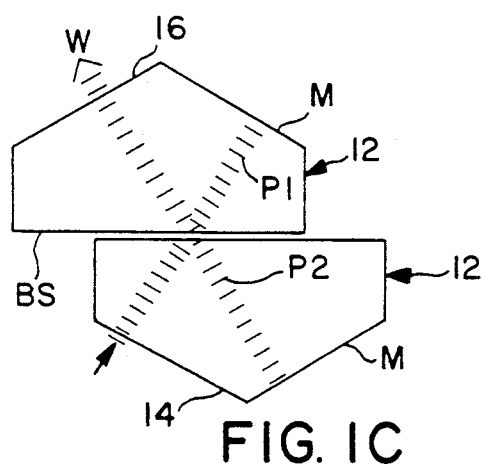
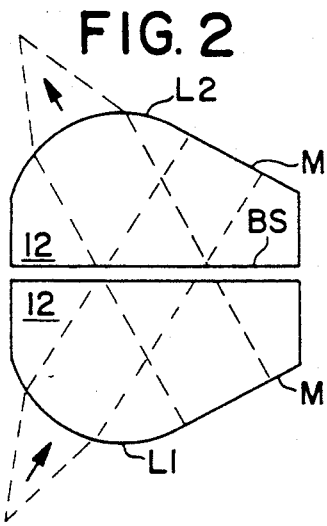
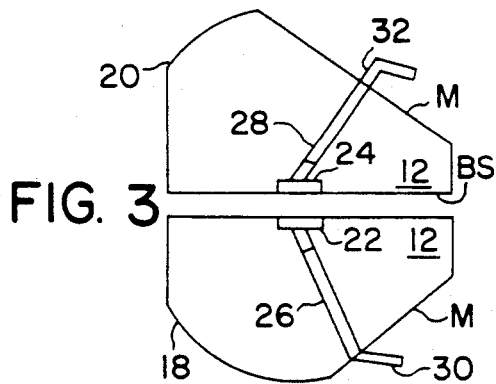
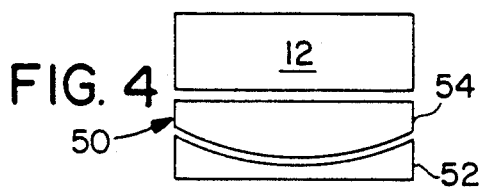
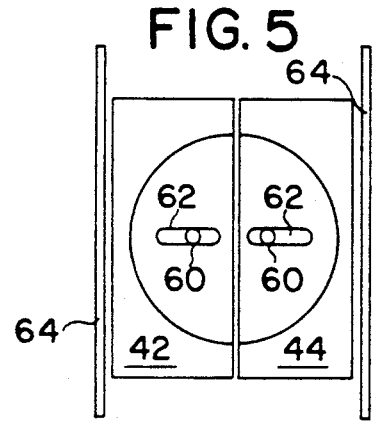

REFRACTIVELY SCANNED INTERFEROMETER

BACKGROUND OF THE INVENTION

This invention relates generally to refractively scanned interferometer/spectrometers and more particularly to a novel, improved, miniature, opto-mechanical head incorporated in a Fourier Transform Spectrometer (FTS) that utilizes only two, substantially identical, optical components that enable the maintenance of a very high throughput efficiency.

Optical spectroscopy is at present the most used analytical technique for both laboratory and remote sensing. To advance the capability of FTS apparatus, two beam interferometers of the Michelson type and of related, refractively scanned instruments have been developed. An example of the latter type of apparatus is my U.S. Pat. No. 4,654,530 for a REFRACTIVELY SCANNED INTERFEROMETER granted on 31 Mar., 1987, which presents a long term, alignment stable and vibration resistant, portable, optical structure that represented an improvement in the FTS art and has been particularly useful for remote sensing applications under field conditions. However, a need exists for an apparatus with even greater sensitivity, stability, smaller size and weight coupled with improved radiometric performance.

As pointed out in my afore-mentioned patent, reflective scanning had deficiencies that were overcome by refractive scanning. Also, a linearly scanned, wedge-shaped transmission window to create a differential in optical path length, where the varying thickness of the wedge shape resulted in a proportional optical retardation, had deficiencies. Known devices of this type caused complications in design and had sensitivity to external forces from hostile environments. The wedge was also an additional component to the standard Michelson configuration and thus added to the cost and subtracted from the efficiency.

Although the Michelson type of instruments has been refined to reflect a high degree of efficiency, they usually suffer in performance in hostile and adverse environments unless heavy and costly vibration cancelling mounts are provided. Furthermore, their sensitivity to mechanical disturbances has all but limited their use to infrared and millimeter wavelengths. Few attempts have been made to extend their use to the short wavelength visible and ultraviolet spectrum.

It has become axiomatic that the larger the instrument and the more parts there are to the optical system, the greater the difficulty in maintaining alignment and, consequently, accuracy. The environmental stability of interferometric devices deteriorates roughly with volume.

Although the prior art has made strides toward the production of a small, hand portable, inexpensive device which is accurate, even though it is subjected to a hostile environment, as evidenced by my afore-mentioned U.S. patent, a rugged, miniaturized device, which solves the problems of the prior art and at the same time provides an interferometer that achieves improved resolution, has proved elusive. Laboratory devices of large size have heretofore been required for accurate measurement.

SUMMARY OF THE INVENTION

This invention involves the utilization of only two substantially identical prism elements for the optical head of a modified Michelson type spectroscopic interferometer that also serves as the interferometric cavity structure. Each element includes structure as a part thereof to provide the element with multifunctions. The resultant structure of the invention produces many advantages and achieves many objectives deemed desirable in apparatus of this type.

Accordingly, it is a primary object of this invention to provide a refractive scanning by linear reciprocation of a pair of prism elements in an interferometer/spectroradiometer to cause a pair of optical light beam paths of different lengths to produce light interference at a point at which the two beams recombine to result in interference fringes.

It is an additional object of this invention to provide an interferometer capable of utilization as a Fourier transform interferometer/spectroradiometer that is smaller in size and weight than that heretofore known, and, although very compact, has higher sensitivity and speed over the prior art devices while maintaining throughput and resolution.

It is another object of this invention to provide a refractively scanned Michelson type interferometer which utilizes the advantages of my afore-mentioned U.S. Pat. No. 4,654,530 and has the throughput and resolution of instruments of 10 times its volume.

It is still another object of this invention to provide an interferometer which has a reduced number of components to perform the same functions as devices of larger size, and wherein multiple functions and structure are included in a single component.

It is a further object of this invention to provide a novel optical head design that does not require high optical shape tolerance in that two prism elements are utilized that do not have to be identical to a very close tolerance, thereby minimizing manufacturing problems.

It is a still further object of this invention to provide an interferometer/spectroradiometer that is capable of use in the various spectral ranges, i.e., the infrared, near infrared, visible and ultraviolet ranges.

Another object of this invention involves an interferometer design that can make fiber optics an integral part of the optical cavity to provide input to sensors to give the resultant instrument suitability for hostile environmental applications.

Still another object of this invention is to provide a very small size, light, spectrometer with improved performance, which includes only two, very solid, optical structures with coatings to take the place of separate components, such as mirrors, beamsplitters, etc., thereby eliminating mounting screws for the components with their attendant disadvantages.

A further object of this invention involves the provision of an optical interferometer head that utilizes a beamsplitter that is formed as part of the refractive prism in order to avoid deformation to which thin plate beamsplitters are subject and which may be optimized for spectral regions of interest.

A still further object of this invention involves the production of an optical head for an interferometer/spectroradiometer that does not require the separate mounting of many of its optical components to a support structure and also accommodates integrated detector mounting. Separate mounting introduces increased sensitivity to vibration and misalignment.

An additional object of this invention is to produce an interferometer design which allows for easy and permanent, precision, optical alignment without gaps, torque or stress being applied to the optical components, and also accommodates detector mounting with its electronics.

A still additional object of this invention may allow for the elimination of ball bearings in the design for movement of the refractive plate, allows for the use of a rotary motor, and may incorporate thin oil film damping for the optical head of an interferometer/spectroradiometer.

It is a further object of this invention to provide a chunky FTS instrument which allows for easy control of its parameters without structural distortion, thereby attaining a higher wavefront accuracy.

It is a still further object of this invention to provide an optical head with a short optical air path such that the beamspread caused by the field of view would not require enlarging the diameter of the optics.

Another object is to produce an instrument which minimizes the approximately 4% loss caused by each transition of a beam through optical boundaries in the usual Michelson type devices by utilizing only two coated components which result in fewer transitions, thereby providing for a loss factor reduction and a resultant efficiency of approximately 2.5 times that expected.

An additional object of this invention is to provide an opto-mechanical head having a hexagonal prism divided in half to produce a pair of refractive members that are linearly reciprocated relative to one another in conjunction with associated integral fiber optics.

Still another object of this invention is to produce an interferometer/spectroradiometer device that is easy and economical to produce of conventional, currently available materials that lend themselves to standard mass production manufacturing techniques.

These and other advantages, features and objects will become more apparent from the following description taken in connection with the illustrative embodiments in the accompanying drawings.

BRIEF DESCRIPTION OF THE DRAWINGS

An interferometer/spectrometer in accordance with the present invention will be described infra, with reference to the accompanying drawings, which are not drawn to scale, of which FIGS. 1A, 1B and 1C are a schematic representations of one embodiment of the prism members of the interferometer optical head of this invention, illustrating the different relative positions of the members for the provision of optical path length differences;

FIG. 2 is a schematic representation of the interferometer head embodiment of FIG. 1 modified to include collimating and focusing optics as a part of the prism members;

FIG. 3 is a schematic representation of an alternative embodiment of the optical head prism members modified to include fiber optics for the input and output;

FIG. 4 is a front view of a prism with a balljoint alignment system consisting of a concave/convex lens doublet;

FIG. 5 is a plan view of a drive mechanism utilizing a rotary motor;

DESCRIPTION OF THE PREFERRED EMBODIMENTS

Figure 7:
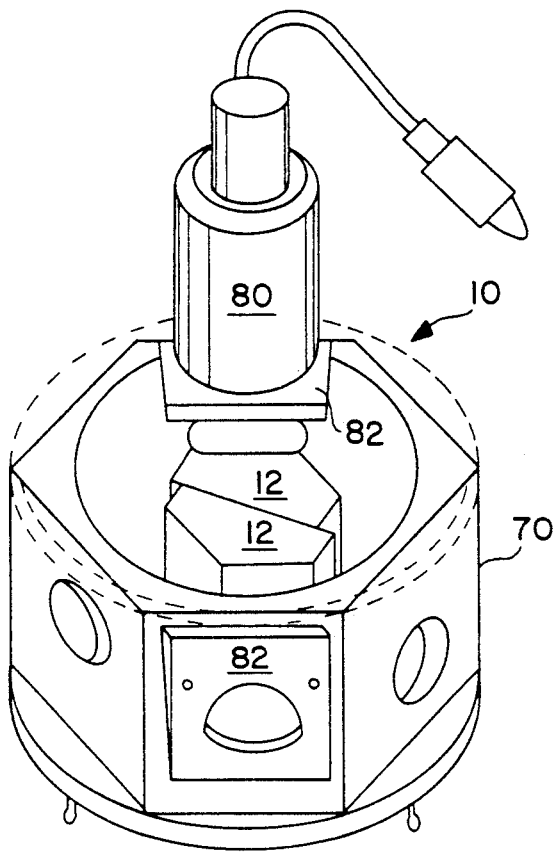
FIG. 7 is a pictorial representation of the optical head of this invention including a laser.

Referring to the drawings wherein like numerals and letters designate like parts, there is shown in FIGS. 1A, 1B and 1C prism elements 12 of an optical head of the micro-FTS scanning apparatus of this invention. A hexagonal prism has been divided in half to produce the prism elements 12, which are arranged for relative, linear reciprocation in the directions illustrated by the arrowed line S of FIG. 1A. Conventional mirror coatings M have been applied to the the surfaces of the prism elements 12, as shown, in order to reflect the beams impinging thereon that are transmitted within the prism elements. A beamsplitter coating BS is applied in a conventional manner to the upper prism in FIGS. 1A, 1B and 1C (as shown) and may be comprised of a partially reflective coating or multi-layer interference coatings optimized for spectral regions of interest. The beamsplitter allows close to 50% of the original beam directed thereto to pass therethrough, while the remainder is reflected.

Materials for prism blanks 12 would depend upon the matching of the spectral wavelength characteristics of the material with that which is desired. KBr, KCl and CaF2 for infrared; appropriate glasses for the visible; and CaF2 and quartz for the ultraviolet region are examples of some of the materials that may be utilized.

The optical path lengths at the different positions can be understood with reference to the plane parallel, optical wavefront, labeled W, which enters at surface 14 of the lower transmitting prism of the pair and is amplitude divided by the beamsplitter coating BS, reflected by each of the mirror coatings M and interferometrically recombined at BS before exiting at surface 16 of the upper prism 12 of the prism pair toward a detector, not shown.

When the prisms 12 are at one of their two maximum positions, for example, as illustrated in FIG. 1A, the optical path P1 is longer than P2. At mid scan, as illustrated at FIG. 1B, optical paths P1 and P2 are equal. FIG. 1C, at the second of the two maximum positions, shows that optical path P2 is longer than P1, the opposite to FIG. 1A.

By using a prism with a refractive index of approximately 1.5, and the parameters of a fist sized optical head assembly, the highest reasonable spectral resolution for gases would be about 1 wavenumber. This amounts to an improvement factor of 4 times that of the structure represented by my afore-mentioned patent. For maximum throughput at short wavelengths a resolution of 4 wavenumbers would be reasonable. This means that resolving powers of 10,000 are achievable over a wide spectral range. A wavenumber of 4 may be achieved with vapors and approximately 10 for solids with the use of the apparatus of this invention.

As was illustrated in my afore-mentioned patent, an interferometer/spectrometer generally comprises a light source, collimating optics, a rapid scanning interferometer, also known as an interferometer modulator or optical scanning head which includes a drive therefor, detector optics, a detector and electronics, which may include amplifiers, a Fourier transform computer with software and a spectrum display. Except for the interferometer, the remaining items are standard, currently available components and are not detailed in the drawings.

Because of the compactness of the interferometer of this invention, some of the ancillary components mentioned, plus others that may be useful, such as a laser, are illustrated and may be incorporated in the optical head structure in order to produce a complete instrument for advantageous purposes mentioned in this specification.

FIG. 2 illustrates diagramatically the prisms 12 of FIG. 1 that have been modified by forming collimating lens L1 and/or focusing lens L2, as shown, to be integral with its prism in order to function with an input source and a detector, respectively.

FIG. 3 is a schematic representation of a pair of prisms 12 that have been modified in design to include a pair of spherical mirrors 18 and 20 formed by coating the now spherical surfaces that replace surfaces 14 and 16 of FIG. 1. Additionally, to prepare the prism members for remote sensing with fiber optics, silvered spots 22 and 24 are provided, as shown, with small bores 26 and 28 connecting therewith to receive optical fiber bundles 30 and 32. The optical fibers 30 and 32 are cemented to their bores or passageways 26 and 28, respectively, and are optically connected to the input beam source and detector, not shown. The small loss of light due to the silver spots 22 and 24 and the bores 26 and 28 amounts to approximately 10%; however, the advantage of having no components mounted to an interferometer bench, remote mounting of the detector with its electronics, as well as having the input fiber 30 able to provide input from hazardous environments, more than compensate for the slight loss. In this embodiment the input and output lenses and detectors can be incorporated with its prism (as with the other embodiments) to travel with its lens or be placed in any convenient position connected with its optical fiber bundle.

Initial interferometric alignment of the two prisms 12 to each other is achieved by interfacing one of them to a drive arrangement by means of a lens pair or doublet 50 that acts as a ball joint, see FIG. 4. A slide 42 or 44, as will later be described relative to FIGS. 5 and 6, has attached to it directly one of the lenses of the doublet, which is shown for convenience as the concave lens 52. Its convex mate 54 of identical curvature i.e., of the same radius, is attached to one of the prisms 12. A film of ultraviolet curable, optical epoxy between the mating portions of the lens doublet permits lubricated, relative rotation and tilt between the lenses 52 and 54. A short flash or exposure to an u.v. lamp, when final alignment is achieved, sets the optics 12 permanently without introducing gaps in the mount, inducing stress or requiring screws.

Figure 6:
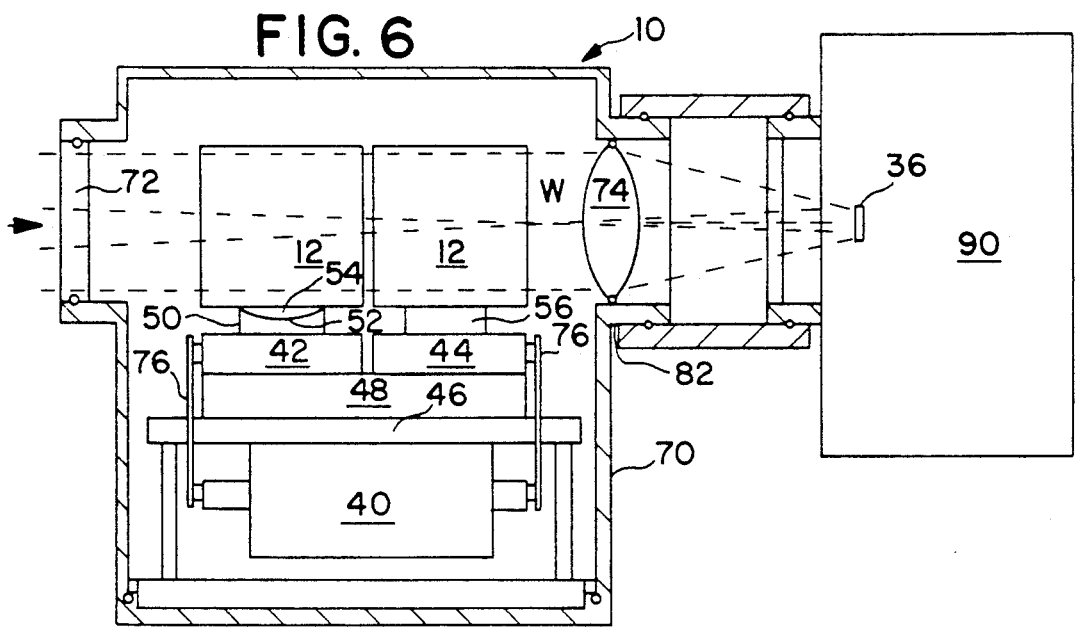
FIG. 6 is a schematic presentation of an interferometer/spectrometer system incorporating the concepts of this invention.

By choosing long focal length lenses for the doublet 50, thereby resulting in a very shallow curvature to the lenses, one can make the adjustment movement fairly large without causing much tilt, such that the doublet assembly acts as a micrometer adjustment. For reduction of the number of parts with its attendant advantages, one lens radius could be ground into the prism bottom. Of course, the doublet could be a suitable, inexpensive, commercially available lens pair, since the optical properties are not pertinent to the interferometer optical system. The u.v. epoxy can be used with a spacer 56, as shown in FIG. 6, for the second of the pair of slides to its prism to avoid the cost of two doublet lens systems.

The ball joint doublet system for alignment has many degrees of freedom. Tilt from side to side changes the projection of the prism roof angle, therefore, matching unequal prisms is easy and costs are reduced by relaxing manufacturing tolerances.

On the other hand, perfectly matched prism pairs, an unlikely situation, would require, after interferometer alignment with adjacent prism faces nearly parallel, a disturbance of the parallelism in order to avoid the multiple reflections that produce unwanted signals in the spectrum when presented to the detector.

FIG. 5 illustrates a method for converting rotary motion to linear reciprocation. A pair of pins 60 from a constant speed rotary torque motor are in engagement with slots 62 of slides 42 and 44 on which prisms 12 would be mounted and aligned. As the motor turns, a synchronized motion of the linearly guided slides 42 and 44 between guides 64 would be effected. Pins 60 in slots 62, if well fitted, result in a mass balanced drive. When optically polished straight and flat ways are utilized, an interferometrically acurate drive is produced. If the slides and ways have the optical polishing and a very thin film of oil is used, a strong adhesion between the moving parts results while providing a nonlinear viscous resistance to the drive force versus velocity. This effect tends to dampen vibrational drive errors and acts as a self servo for the higher frequencies.

The opto-mechanical head 10 of FIG. 6 comprises two substantially identical prisms 12, such as described relative to FIGS. 1A through 1C, of a material capable of transmission of light of the wavelength corresponding to an input beam. For use with multiple wavelengths the prism blanks 12 could be of a material capable of transmission of most of the wavelengths with reliance upon various multilayer beamsplitter interference coatings for providing utility with particular wavelengths of interest.

No compensator window is required since the optical path is balanced. Optical polishing and tolerance maintenance are used to eliminate, or at least minimize, any (spacing) dispersion. No rubbing of the beamsplitter coating BS occurs because of the very small airgap between it and its adjacent prism element. An input beam source is illustrated entering an opening in a housing or enclosure 70, which would be appropriate, hermetically sealed in a conventional manner to eliminate moisture and other items that might adversely affect the interferometer operation and pressurized with an inert gas that doesn't affect the optical properties of the interferometer, such as nitrogen. Housing 70 may have collimating optics such as lens 72, which directs the beam from a conventional source into the interferometer left (as shown) prism blank 12. A lens 74 for focusing the exiting beam from the interferometer head to a detector 36, connected with spectrometer apparatus 90, receives the output from the optical head 10. When the optics are a part of the prisms, as previously described relative to FIG. 2, plate glass could be used and sealed in housing 30.

Although FIG. 5 illustrated a particular pin drive system, the embodiment of FIG. 6 could accomodate other systems which might utilize, for example, drive bands 76 or pulley arrangements. As shown, a torquemotor 40 is conventionally mounted and positioned beneath base 46 which supports a platform 48 upon which slides 42 and 44 are driven at constant speed in opposite directions by the torquemotor 40. If drivebands 76 are used, the bands twist slightly to mediate between the rotating motion of the motor and the linear motion of the slides.

Backlash is eliminated with the use of bands and the system is easily mass balanced to avoid disturbance by tilting or shaking of the instrument. Slides 42 and 44 are mounted to the common table or platform 48, which in turn is mounted to the base 46 via any conventional stress free mounting arrangement.

By utilizing diamond machining, the production of the prisms with lenses and/or mounting systems as a part thereof proves to be very economical once jigs have been made. The savings of expensive material, such as CaF2 for infrared applications, the savings of time for alignment, and the elimination of costs of lenses renders the combining of multi-functions in a prism structure and the u.v. epoxy mounting system important factors in the economic aspects of the interferometer of this invention.

FIG. 7 is a pictorial representation of the interferometer of this invention with the cover of the housing enclosure 70 represented by dashed lines so that the interior is visible. The housing in this instance is hermetically sealed in a conventional manner and pressurized with an inert gas such as nitrogen. Housing 70 may be of hexagonal shape, as shown, or of any square, rectangular or other of the commercially available shapes having a stock inventory. Attachment flanges 82 are provided for some of the portholes for modular, sealed input and output optics, detectors, sampling chambers, light sources, etc. A laser 80 is flange mounted to the top cover of the housing enclosure 70 and provides a calibration or reference signal, interferometrically modulated for detection by its detector.

OPERATION

The devices, thus far described, illustrate an interferometer of the modified Michelson type wherein an input beam (from a glowing or a transmission through a sample to be analyzed or an emission from a sample or the environment) has its beam collimated, enters the prism 12 and is transmitted to an appropriate beamsplitter, is split into at least two parts, which after being modified are combined to either constructive (brightness) or destructive (cancelling) interference.

The prisms of this invention, in combination with a constant speed, linear drive, form an optical head or scanning interferometer. The scanning action produces a constantly changing optical path length difference within the two prisms which leads to interferometric optical modulation. The input and/or laser beam is applied by its optics perpendicular to a side of its prism and traverses it until it strikes at an angle of approximately 30 degrees to the facing surface, thereby avoiding backward reflection. Upon striking the beamsplitter on one of these opposing surfaces, the beam is divided and each approximately 50% is directed to a mirrored surface of its prism.

The scanning at constant speed causes each wavelength to be interferometrically encoded with a different frequency. These frequencies are simultaneously translated into electric signals by the optical detector and then Fourier transformed into a presentation of the optical spectrum. Parallel to the sample input beam is a narrow monochromatic laser beam which is generated by a diode laser source and transmitted and modulated interferometrically for presentation to a separate optical detector. The resultant frequency is used as a reference signal for wavelength determination and calibration and as a reference clock for an analog to digital conversion. It should be noted that only one prism need be driven; however, speed and the avoidance of vignetting, balance and resistance to disturbing acceleration dictate dual reciprocation. Split hexagonal prisms with different refractive indexes, depending upon the materials, for example saphire or zinc selenide, require different angles between some of its sides to accomodate beam refraction.

Thus, there has been provided a low cost, rugged device, miniaturized in both size and weight with accuracy and precision with a pair of substantially identical, solid, optical elements where no components are required to be supported on an optical bench, since mirrors and lenses may be made integral with the refractively scanned structure. The result is a portable device for field use with easily obtained, fixed alignment with excellent throughput and resolution. Multiple spectral ranges are available in a single instrument, thereby eliminating the need for multiple spectrometers. The device is admirably suited for process control, pre-fire warning, environmental and safety protection, active and passive remote sensing of solids and gases, including hazardous materials, and for low cost, high performance analytical laboratory applications.

Although the invention has been illustrated in the accompanying drawings and described in the foregoing specification, in terms of preferred embodiments thereof, the invention is not limited to these embodiments. It will be apparent to those skilled in this art that certain changes, modifications and substitutions can be made without departing from the true spirit and scope of the appended claims.

I claim:

1. An interferometer for use in spectroscopy comprising,
   a pair of substantially identical prisms of pentagonal cross section such that a corresponding face of each of said prisms, when placed in juxtaposition, result in a geometric shape of hexagonal cross section,
   a partially reflective beamsplitter coating on a juxtaposed face of one of said prisms for receiving an input beam from a surface not contiguous with a juxtaposed face of either of said prisms and dividing the beam into a transmitted beam and a reflected beam,
   a mirror coating on the surface receiving the reflected beam from said beamsplitter, said surface being non-contiguous with a juxtaposed face, and for reflecting the received beam toward an output surface,
   a mirror coating on the surface receiving the transmitted beam from said beamsplitter, said surface being non-contiguous with a juxtaposed face, and for reflecting the received beam toward an output surface, and
   linear drive means for causing a relative, constant speed reciprocation of said prisms in the direction of said juxtaposed faces for changing the optical path lengths of the beams forming an outlet beam.

2. An interferometer as defined in claim 1 wherein a hermetically sealed housing enclosed the interferometer in order to eliminate moisture and other items that might adversely affect the interferometer operation.

3. An interferometer as defined in claim 2 wherein said housing is pressurized with an inert gas that does not affect the optical properties of the interferometer.

4. An interferometer as defined in claim 1 wherein said prisms are out from a single prism blank.

5. An interferometer as defined in claim 1 wherein the surface for receiving the input beam has a collimating lens forming an integral part of its prism.

6. An interferometer as defined in claim 1 wherein the surface for receiving the output beam has a focusing lens forming an integral part of its prism for focusing the beam on a detector.

7. An interferometer as defined in claim 1 wherein the beamsplitter coating is a multi-layered interference coating for accommodating various spectral regions for extending the use of a single interferometer for muliple spectral regions.

8. An interferometer as defined in claim 1 wherein the prisms, when aligned to form a geometric shape of hexagonal cross section, have angles between adjacent sides of the hexagon that are not equal, when required to accommodate beam refraction to the appropriate surfaces.

9. A miniature, light weight interferometer for use in spectroscopy comprising,
- a pair of substantially identical prisms of pentagonal cross section such that a corresponding surface of each of said prisms, when apposed with a very small air gap, result in a geometric shape of hexagonal cross section,
- a partially reflective beamsplitter coating on an apposed surface of one of said prisms for receiving an input beam from a surface not contiguous with an apposed surface of either of said prisms and dividing the beam into a transmitted beam and a reflected beam,
- a mirror coating on the surface receiving the reflected beam from said beamsplitter, said surface being non-contiguous with an apposed surface, and for reflecting the received beam toward an output surface,
- a mirror coating on the surface receiving the transmitted beam from said beamsplitter, said surface being non-contiguous with an apposed surface, and for reflecting the received beam toward an output surface, and
- linear drive means for causing a relative, constant speed reciprocation of said prisms in the direction of said apposed faces for changing the optical path lengths of the beams forming an outlet beam.

10. An interferometer as defined in claim 9 wherein a hermetically sealed housing encloses the interferometer in order to eliminate moisture and other items that might adversely affect the interferometer operation.

11. An interferometer as defined in claim 10 wherein said housing is pressurized with an inert gas that does not affect the optical properties of the interferometer.

12. An interferometer as defined in claim 9 wherein the prisms, when aligned to form a geometric shape of hexagonal cross section, have angles between adjacent sides of the hexagon that are not equal, when required to accommodate beam refraction to the appropriate surface.

13. An interferometer as defined in claim 9 wherein the surface for receiving the input beam has a collimating lens forming an integral part of its prism.

14. An interferometer as defined in claim 9 wherein the surface for receiving the output beam has a focusing lens forming an integral part of its prism for focusing the beam on a detector.

15. An interferometer as defined in claim 9 wherein the beamsplitter coating is a multi-layered interference coating for accommodating various spectral regions for extending the use of a single interferometer for the multiple spectral regions.

16. An interferometer as defined in claim 9 including a spectrometer with a detector for receiving the beam interferometrically modulated by said interferometer for analysis by said spectrometer.

17. An interferometer as defined in claim 10 including a laser mounted in said housing for producing a narrow, monochromatic beam, which, after passing through said interferometer is applied to a separate detector of a spectrometer for analysis.

18. An interferometer as defined in claim 9 wherein optical alignment of said prisms is achieved by utilizing a lens couplet, including an ultra violet curing epoxy between the mating surfaces of lenses forming the couplet to set the alignment.

19. A miniature, light weight interferometer for use in spectroscopy comprising,
- a pair of substantially identical prisms of generally pentagonal cross section such that a corresponding surface of each of said prisms, when apposed with a very small air gap, results in a geometric shape of generally hexagonal cross section,
- a partially reflective beamsplitter coating on an apposed surface of one of said prisms, for receiving an input beam and dividing the beam into a transmitted and a reflected beam,
- a mirror coating on each of the surfaces of each prism that are not contiguous with an apposed surface to form two mirrors on each prism, one of the mirrors of each prism being a plane mirror and the other mirror of each prism being a curved mirror, the surface of each prism coated to form a curved mirror being of a predetermined curvature,
- a passageway in each prism containing fiber optic means, each passageway terminating at a juxtaposed position proximate to the apposed surface of its prism, and
- a small silvered mirror spot at the termination of each passageway at each juxtaposed position.

* * * * *

UNITED STATES PATENT AND TRADEMARK OFFICE
CERTIFICATE OF CORRECTION

PATENT NO. : 5,173,744

DATED : 12/22/92

INVENTOR(S) : Jens P. Dybwad

It is certified that error appears in the above-identified patent and that said Letters Patent is hereby corrected as shown below:

On the title page, item (76) inventors:

"Jens R. Dybwad" should read --Jens P. Dybwad--.

Signed and Sealed this

Eleventh Day of January, 1994

BRUCE LEHMAN

Attest:

Attesting Officer

Commissioner of Patents and Trademarks